United States Patent [19]

Kobayashi et al.

[11] 4,348,727

[45] Sep. 7, 1982

[54] AIR-FUEL RATIO CONTROL APPARATUS

[75] Inventors: Akio Kobayashi; Takehiro Kikuchi, both of Kariya; Toshio Kondo, Anjo; Masahiko Tajima, Takahama, all of Japan

[73] Assignee: Nippondenso Co., Ltd., Kariya, Japan

[21] Appl. No.: 109,516

[22] Filed: Jan. 4, 1980

[30] Foreign Application Priority Data

Jan. 13, 1979 [JP] Japan ................................ 54-3322

[51] Int. Cl.[3] ........................ G06F 15/20; F02D 5/00; F02B 3/12

[52] U.S. Cl. .............................. 364/431.06; 123/440; 123/480; 123/489; 364/431.05

[58] Field of Search ............... 364/431; 123/480, 486, 123/489, 492, 493, 445

[56] References Cited

U.S. PATENT DOCUMENTS

| | | | |
|---|---|---|---|
| 4,155,332 | 5/1979 | Yaegashi et al. | 123/480 |
| 4,163,282 | 7/1979 | Yamada et al. | 364/431 |
| 4,181,944 | 1/1980 | Yamauchi et al. | 364/431 |
| 4,201,159 | 5/1980 | Kawai et al. | 364/431 X |
| 4,201,161 | 5/1980 | Sasayama et al. | 364/431 X |
| 4,205,377 | 5/1980 | Oyama et al. | 364/431 |
| 4,214,306 | 7/1980 | Kobayashi et al. | 364/431 |
| 4,224,910 | 9/1980 | O'Brien | 123/489 X |
| 4,240,390 | 12/1980 | Takeda | 123/480 |
| 4,270,503 | 6/1981 | Pomerantz | 123/445 X |

*Primary Examiner*—Felix D. Gruber
*Attorney, Agent, or Firm*—Cushman, Darby & Cushman

[57] ABSTRACT

The basic fuel injection amount determined in accordance with the rpm and the amount of air drawn into an engine is corrected by first, second and third compensation amounts determined in accordance with the engine operating conditions. The second compensation amount is varied by a predetermined value in response to the output of an $O_2$ sensor at intervals of a predetermined time. The third compensation amount is read out from the location of a non-volatile memory addressed in accordance with the engine rpm and the intake air amount, varied by another predetermined value at intervals of another predetermined time in accordance with the value of the second compensation amount and stored again in the location from which it was read out. Before starting the compensation of the fuel injection amount, the particular bit pattern stored in the non-volatile memory is checked so as to self-check the third compensation amount data in the non-volatile memory.

7 Claims, 8 Drawing Figures

| Q \ N | 1 | 2 | 3 | --- | n−2 | n−1 | n | n+1 | n+2 | --- |
|---|---|---|---|---|---|---|---|---|---|---|
| 1 | $K_3(1,1)$ | $K_3(2,1)$ | $K_3(3,1)$ | | | | | | | |
| 2 | $K_3(1,2)$ | $K_3(2,2)$ | $K_3(3,2)$ | | | | | | | |
| 3 | $K_3(1,3)$ | $K_3(2,3)$ | $K_3(3,3)$ | | | | | | | |
| ⋮ | | | | | | | | | | |
| m−1 | | | | | $K_3(n-2,m-1)$ | $K_3(n-1,m-1)$ | $K_3(n,m-1)$ | $K_3(n+1,m-1)$ | $K_3(n+2,m-1)$ | |
| m | | | | | $K_3(n-2,m)$ | $K_3(n-1,m)$ | $K_3(n,m)$ | $K_3(n+1,m)$ | $K_3(n+2,m)$ | |
| m+1 | | | | | $K_3(n-2,m+1)$ | $K_3(n-1,m+1)$ | $K_3(n,m+1)$ | $K_3(n+1,m+1)$ | $K_3(n+2,m+1)$ | |
| ⋮ | | | | | | | | | | |

AIR-FUEL RATIO CONTROL APPARATUS

BACKGROUND OF THE INVENTION

This invention relates to an air-fuel ratio control apparatus designed so that the engine exhaust gas composition is detected and fed back to adjust the air-fuel ratio to a desired value.

Air-fuel ratio controllers known in the art, are simple integral controls in which the output of an air-fuel ratio sensor mounted in the intake pipe of an engine to detect the air-fuel ratio of the mixture supplied to the engine varies with time and the air-fuel ratio of a mixture is corrected in accordance with the sensor output. As a result, during periods of transitional engine operation, if the basic air-fuel ratio varies more rapidly than the rate of compensation of the integral control, the compensation of the air-fuel ratio provided by the closed loop control, in accordance with the output of the air-fuel ratio sensor, cannot follow the variation. Moreover, it is impossible to control the air-fuel ratio of mixtures satisfactorily, with the resulting deterioration of exhaust gas emissions when feedback control is impossible due to an inoperative air-fuel ratio sensor.

SUMMARY OF THE INVENTION

With a view to overcoming the foregoing deficiencies in the prior art, it is an object of the invention to provide an air-fuel ratio control apparatus which is designed so that not only the air-fuel ratio of a mixture supplied to an engine can be rapidly controlled at any desired ratio without any delay in the response during periods of transitional engine operations, but also the air-fuel ratio control can be accomplished with improved response and accuracy in accordance with the compensation data stored in a non-volatile memory even during operation at low engine temperatures where an air-fuel ratio sensor is inactive, making it impossible to effect closed loop control in response to the output of the air-fuel ratio sensor.

This object is accomplished advantageously in the present invention by providing, in addition to the ordinary integral control performed in response to the output of the air-fuel ratio sensor, a plurality of values, each corresponding to the integrated data derived by the integral control and one of the respective engine conditions, are stored as compensation data in a non-volatile memory. The air-fuel ratio of a mixture is feedback controlled in accordance with the currently integrated data and one of the stored compensation data corresponding to the current engine conditions.

It is another object of the invention to provide such air-fuel ratio control apparatus which is designed so that even when the contents of the non-volatile memory are erased and completely wrong values are written into the memory (as when the vehicle battery is removed), the air-fuel ratio is not controlled erroneously in accordance with the wrong values.

DESCRIPTION OF THE PREFERRED EMBODIMENTS

The present invention will now be described in greater detail with reference to the illustrated embodiments.

Figure 1:
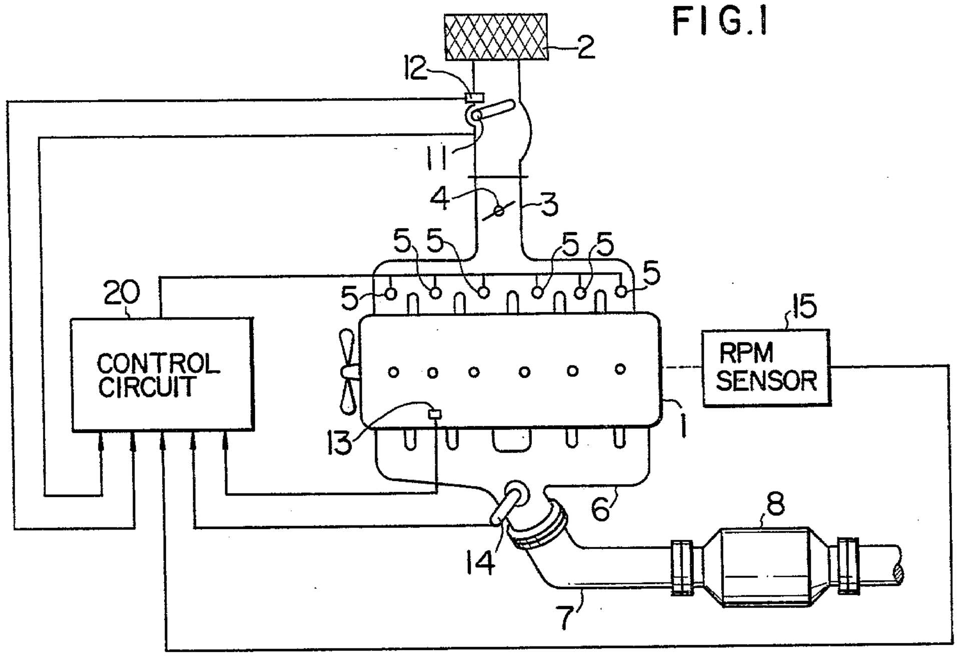
FIG. 1 is a schematic diagram showing the overall construction of a first embodiment of the invention.

Referring to FIG. 1 showing a first embodiment of the invention, an engine 1 is a known type of four-cycle spark ignition engine installed in an automotive vehicle. Air required for combustion is drawn by way of an air cleaner 2, an intake pipe 3 and a throttle valve 4. The fuel is supplied from a fuel system which is not shown through electromagnetic fuel injection valves 5 which are mounted for the respective cylinders. The exhaust gases resulting from the burning of the mixture are discharged to the atmosphere through an exhaust manifold 6, and exhaust pipe 7, a three-way catalytic converter 8, etc. Mounted in the intake pipe 3 is a potentiometer-type air-flow sensor 11 for both sensing the quantity of air Q sucked into the engine 1 and generating an analog voltage corresponding to the sucked air quantity Q. Also mounted in intake pipe 3 is a thermistor-type intake air temperature sensor 12 for sensing the temperature of the air sucked into the engine 1 and generating an analog voltage (analog detection signal) corresponding to the temperature of the sucked air. A thermistor-type water temperature sensor 13 is mounted in engine 1 for sensing the temperature of the cooling water and generating an analog voltage corresponding to the cooling water temperature. Mounted in the exhaust manifold 16 is an air-fuel ratio or $O_2$ sensor 14 for sensing the air-fuel ratio from the oxygen content of the exhaust gases whereby a voltage of about 1 volt (high level) is generated when the air-fuel ratio is small (rich) as compared with the stoichiometric ratio and a voltage of about 0.1 volt (low level) is generated when the air-fuel ratio is great (lean) as compared with the stoichiometric ratio. A rotational speed or RPM sensor 15 senses the rotational speed of the crankshaft of the engine 1 to generate a pulse signal of a frequency corresponding to the rotational speed. The RPM sensor 15 may for example be comprised of the ignition coil of the ignition system so as to use the ignition pulse signal from the ignition coil primary winding as a rotational speed signal. A control circuit 20 is provided to compute the desired fuel injection amount in accordance with the detection signals from the sensors 11 to 15 and the duration of opening T of the electromagnetic fuel injection valves 5 is controlled so as to adjust the amount of fuel injected.

Figure 2:
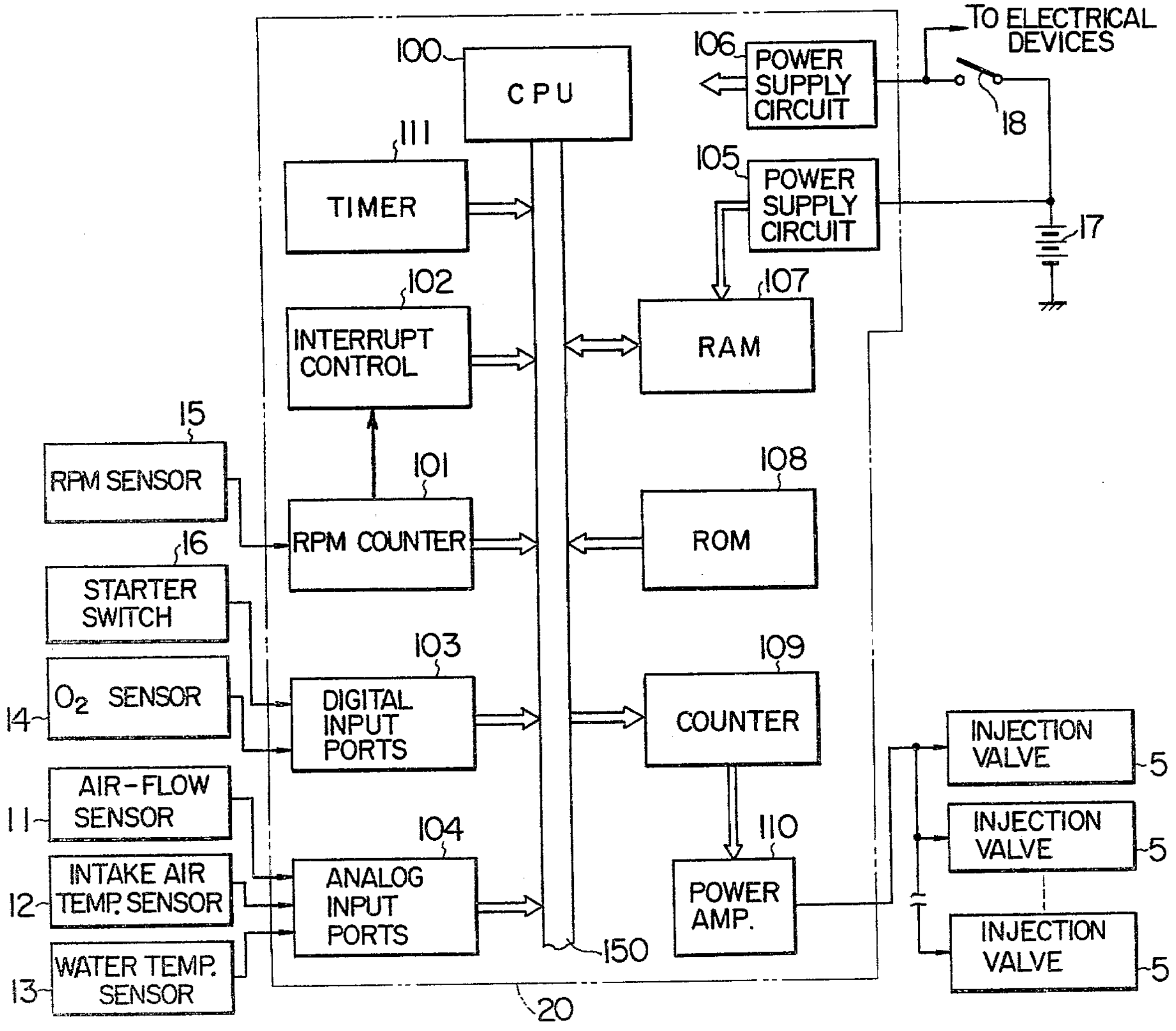
FIG. 2 is a block diagram of the control circuit shown in FIG. 1.

The control circuit 20 will now be described with reference to FIG. 2. In this embodiment the control circuit 20 comprises a programmed digital computer in which numeral 100 designates a microprocessor (CPU) for computing the amount of fuel injected. Numeral 101 designates an RPM counter for generating a signal related to the speed of the engine in response to the signal from the RPM sensor 15. Also the RPM counter 101 applies an interrupt command signal to an interrupt control 102 in synchronism with the rotation of the engine 1 (or just after the completion of the counting of the engine rpm). When the signal is applied to the interrupt control 102, an interrupt request signal is applied to the microprocessor 100 from the interrupt control 102 through a common bus 150. Numeral 103 designates digital input ports for transferring to the microprocessor 100 digital signals including the output signal of the $O_2$ sensor 14, the output signal of a starter switch 16 for turning on and off the operation of a starter which is not shown or the signal indicative of the ON or OFF state of the starter, etc. Numeral 104 designates analog input ports comprising an analog multiplexer and an A/D converter and adapted to serve the function of subjecting the signals from the air-flow sensor 11, the intake air temperature sensor 12 and the cooling water temperature sensor 13 to A/D conversion and then successively reading them into the microprocessor 100. The output data from these units 101, 102, 103 and 104 are transferred to the microprocessor 100 through the common bus 150. Numeral 105 designates a power supply circuit for supplying power to an RAM 107 which will be described later. Numeral 17 designates a battery, and 18 a key switch. The power supply circuit 105 is connected to the battery 17 directly and not through the key switch 18. As a result, the power is always applied to the RAM 107 which will be described later irrespective of the key switch 18. Numeral 106 designates another power supply circuit which is connected to the battery 17 through the key switch 18. The power supply circuit 106 is connected to the units except the RAM 107. The RAM 107 comprises a temporary read/write memory unit used temporarily by the computer. Power is always applied to it irrespective of the key switch 18 so that the stored contents are prevented from being erased even if the key switch 18 is turned off and the operation of the engine is stopped. The RAM 107 is formed by a memory made effectively non-volatile by direct connection to battery 17. The values of compensation amount $K_3$ which will be mentioned later are also stored in the RAM 107. Numeral 108 designates a read-only memory (ROM) for storing a program (operating instructions of the CPU 100), various constants, etc. Numeral 109 designates a fuel injection period control counter including a register and the counter 109 comprises a down counter whereby a digital signal computed by the microprocessor or CPU 100 and indicative of the valve opening period T or the fuel injection amount is converted to a pulse signal of a time width which determines the actual duration of opening of the electromagnetic fuel injection valves 5. Numeral 110 designates a power amplifier for actuating the fuel injection valves 5. Numeral 111 designates a timer for measuring and transferring the elapsed time to the CPU 100.

The RPM counter 101 receives the output of the RPM sensor 15 and generates a signal related to engine rpm and upon completion of the measurement an interrupt command signal is applied to the interrupt control 102. In response to the applied signal, the interrupt control 102 generates an interrupt request signal and consequently the microprocessor 100 performs an interrupt handling routine which computes the amount of fuel to be injected.

Figures 3, 6:
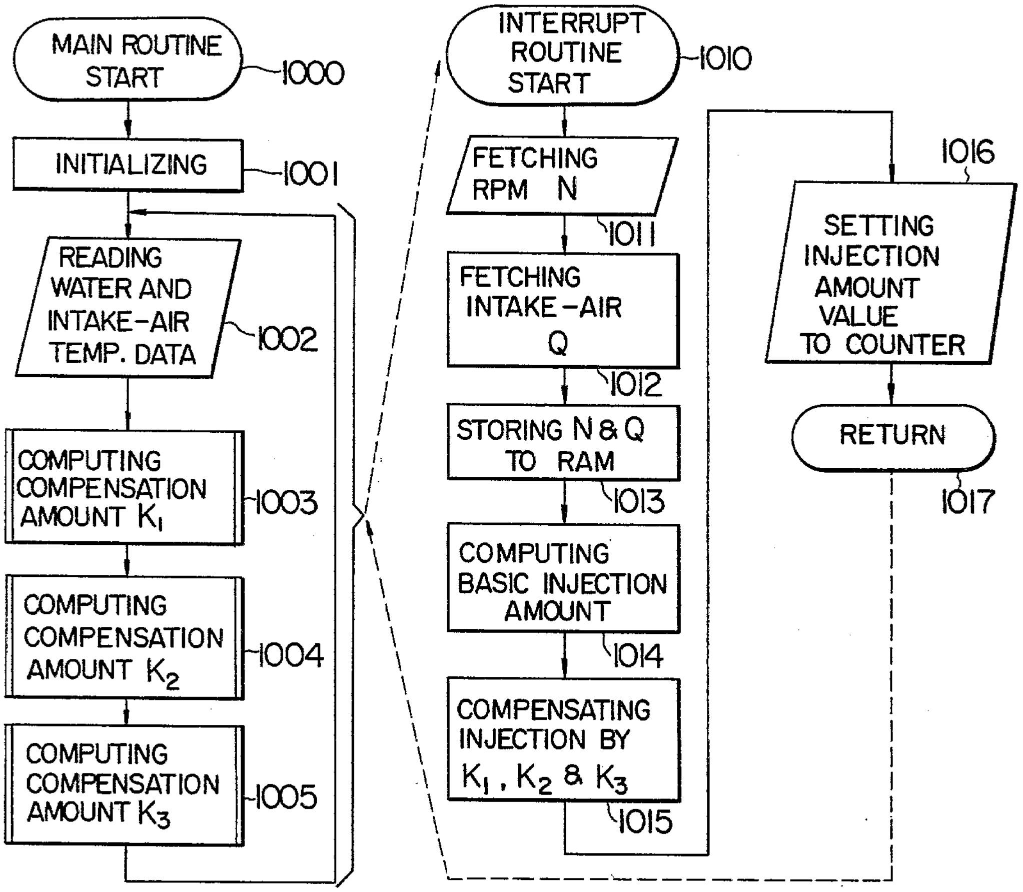
FIG. 3 is a brief flow chart of the microprocessor shown in FIG. 2.
FIG. 6 is a map of compensation amounts $K_3$ useful in explaining the operation of the first embodiment.

FIG. 3 shows a flow chart for the microprocessor 100 and ROM 108 which preliminarily stores a large number of instructions for performing the steps illustrated.

Figure 4:
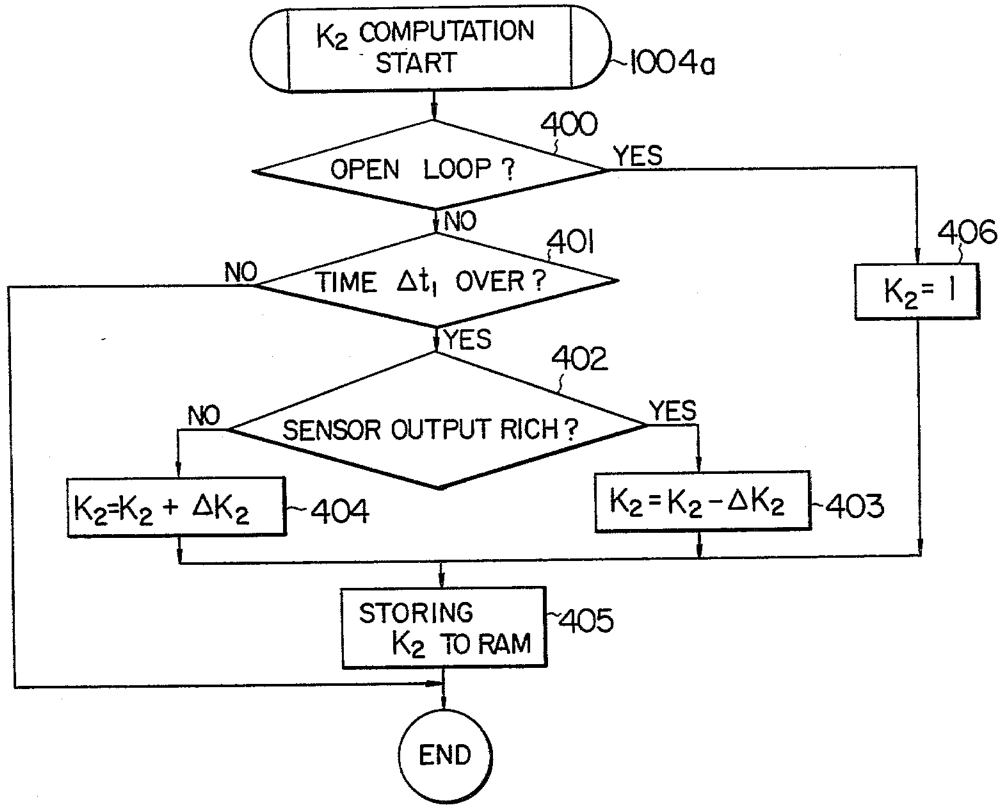
FIG. 4 is a detailed flow chart of the step 1004 shown in FIG. 3.

The function of the microprocessor 100 as well as the operation of the entire embodiment will now be described with reference to the flow chart. When the key switch 18 (FIG. 2) and the starter switch 16 are turned on so that the engine is started, a first step 1000 starts the computational operations of the main routine shown on the left side of FIG. 3 so that a step 1001 performs an initialization process and the individual circuits of the computer are reset to their initial states. The next step 1002 reads in the digital values corresponding to the cooling water temperature and the intake air temperature from the analog input ports. A step 1003 computes a compensation amount $K_1$ from the digital values corresponding to cooling water and air intake temperatures and stores the result in the RAM 107. Compensation amounts $K_1$, for various digital values corresponding to cooling water and air intake temperatures may be preliminarily stored in the ROM 108 so as to be read out in response to these values. A step 1004 introduces the output signal of the $O_2$ sensor 14 from the digital input ports 103 so that a compensation amount $K_2$ which will be described in connection with FIG. 4 is varied if a predetermined time has elapsed since the previous $K_2$ variation step as measured by the timer 111. The variation of $K_2$ produces a $K_2$ value similar to an integration result and this result is stored in the RAM 107. The next step 1005 varies a compensation amount $K_3$ which will be described in connection with FIG. 5 and the computation result is stored in the RAM 107.

FIG. 4 is a detailed flow chart for the process step 1004 for integrally varying the compensation amount $K_2$ which compensates the air-fuel ratio of mixtures in response to the output of the $O_2$ sensor 14. The computation of the compensation amount $K_2$ is started by a step 1004*a* and control is transferred to a step 400 which determines whether the $O_2$ sensor 14 is in the active state, that is, whether the feedback control of the air-fuel ratio is possible from the cooling water temperature detected by the water temperature sensor 13. If it is not, that is, when there is an open loop or YES, the control is transferred to a step 406 and the compensation amount $K_2$ is changed to $K_2=1$ and the control is transferred to a step 405 which stores $K_2=1$ in the RAM 107. If the feedback control is possible or NO, the control is transferred to a step 401 which determines whether the elapsed time measured by the timer 111 is over a unit time $\Delta t_1$. If it is not or NO, the compensation amount $K_2$ is not varied so that the old $K_2$ is used and the process step 1004 is terminated. This means that the established $K_2$ is not varied at least during the unit time $\Delta t_1$. When the time $\Delta t_1$ is over or YES, the control is transferred to a step 402 which determines whether the output of the $O_2$ sensor 14 is rich. If it is or YES, that is, the output of the $O_2$ sensor 14 is a high level signal, the control is transferred to a step 403 which decreases by a predetermined value $\Delta K_2$ the compensation amount $K_2$ computed in the preceding cycle and the control is transferred to the step 405 which stores the newly computed compensation amount $K_2$ in the RAM 107. If the step 402 determines that the output of the $O_2$ sensor 14 is a low level signal indicative of the lean mixture or NO, the control is transferred to a step 404 which increases the amount $K_2$ by the predetermined amount $\Delta K_2$ and the control is transferred to the step 405. In this way, each time the unit time expires, the compensation amount $K_2$ is increased or decreased.

Figure 5:
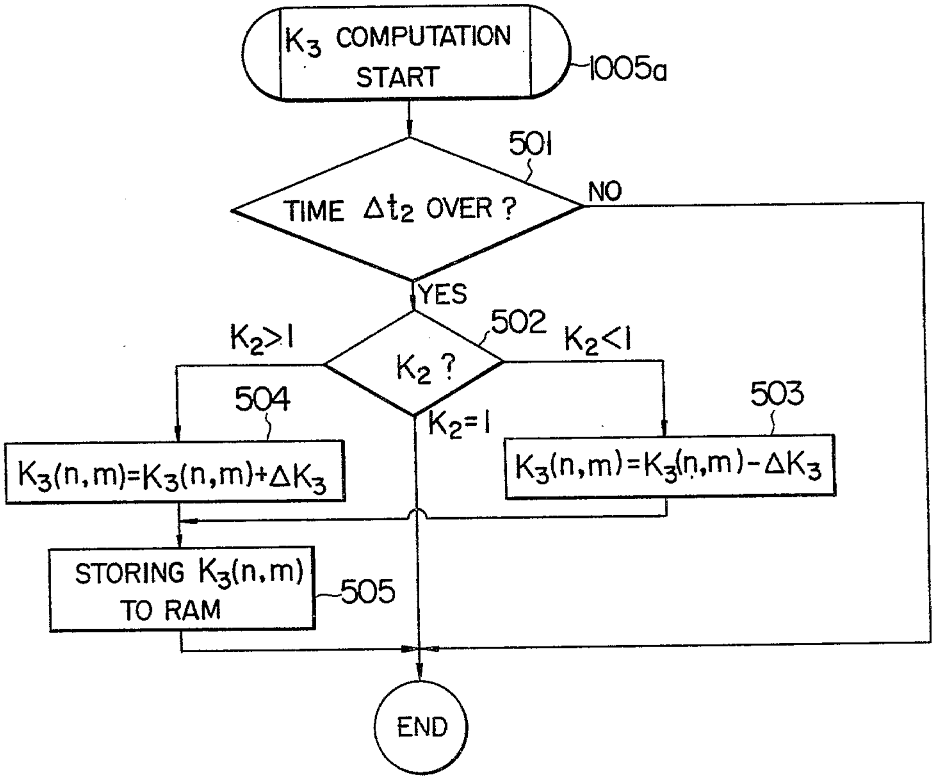
FIG. 5 is a detailed flow chart of the step 1005 shown in FIG. 3.

FIG. 5 is a detailed flow chart for the step 1005 of FIG. 3 which computes and stores the compensation amount $K_3$ or which performs a storage process. The process is started by a step 1005*a* and then the control is transferred to a step 501 which determines whether the elapsed time is over a unit time $\Delta t_2$. If it is not or NO, the storage process step 1005 is completed. This is an indication that the established value $K_3$ is not varied at least during the unit time $\Delta t_2$. When the time $\Delta t_2$ is over or YES, the control is transferred to a step 502 which tests the value of $K_2$. If $K_2=1$, it is an indication that the control is an open loop control and the step 1005 is completed without performing any operation.

Incorporated in the RAM 107 is a map of correction values or the values for the compensation amount $K_3$ which are determined in accordance with the values of the intake air amount Q and the engine rpm N as shown in FIG. 6. In this embodiment, the values of the rpm N are divided into a large number of ranges (1, 2, . . . , n, . . . ) and the values of the air amount Q are similarly divided into a large number of ranges (1, 2, . . . , m, . . . ). Thus, the value of any compensation amount $K_3$ such as $K_3(n,m)$ is stored in a storage location of the RAM 107 such as (n,m) which is addressed in accordance with the rpm N and the air amount Q. If the step 502 determines that $K_2<1$, the control is transferred to a step 503 which specifies the particular one of the values $K_3$ stored in the RAM 107 in accordance with the intake air amount Q and the engine rpm N and decreases the thus determined value $K_3$ by a predetermined value $\Delta K_3$. A step 505 stores again the decreased value $K_3$ in the RAM 107. More specifically, when the corresponding location (n,m) of the RAM 107 is addressed in accordance with the current intake air amount Q and engine rpm N, the value $K_3(n,m)$ stored as the compensation amount $K_3$ in the addressed location is read out and the operation of subtraction $K_3(n,m)-\Delta K_3$ is performed. The resulting difference is again stored as a new value $K_3(n,m)$ in the location (n,m) of the RAM 107. In this case, the values of the compensation amount $K_3$ in the other locations of the RAM 107 are not updated. When the step 502 determines that $K_2>1$, the control is transferred to a step 504 which reads out the value $K_3(n,m)$ stored in one (n,m) of the locations in the RAM 107 addressed in accordance with the then current intake air amount Q and engine rpm N and adds a predetermined value to the same. The next step 505 stores again the resulting sum $K_3(n,m)+\Delta K_3$ in the location (n,m) of the RAM 107. When the control is transferred from the step 504 to the step 505, as was the case when the control was transferred from the step 503 to the step 505, updated is only one of the large number of the stored values $K_3$ in the RAM 107 which corresponds to the then current intake air amount Q and engine rpm N. Referring again to FIG. 3, when the step 1005 of the main routine is completed, the control is returned to the step 1002.

In the normal condition the processes of the main routine steps 1002 to 1005 are repeatedly performed in accordance with the control program stored in the the ROM 108. However, when an interrupt request signal for the computation of fuel injection amount is applied from the interrupt control 102, even if the operation of any step of the main routine is being performed, the microprocessor 100 immediately interrupts the operation and control is transferred to the interrupt handling routine of a step 1010 shown on the right side of FIG. 3. A step 1011 fetches the output signal of the RPM counter 101 which is indicative of the engine rpm N, and the next step 1012 fetches from the analog input ports 104 the signal indicative of the intake air amount Q. The next step 1013 stores the engine rpm N and the intake air amount Q in the corresponding locations of the RAM 107 as parameters for the storage process of compensation amount $K_3$ by the step 1005 in the computation of the main routine. The next step 1014 computes a basic fuel injection amount (or the fuel injection duration t of the electromagnetic fuel injection valves 5) which is determined by the engine rpm N and the intake air amount Q. This may be suitably computed from an equation $t=F\times(Q/N)$ (where F is a constant). The next step 1015 reads out the fuel injection compensation amounts $K_1$, $K_2$ and $K_3$ computed by the main routine from the RAM 107 and corrects the fuel injection amount (the fuel injection duration) which determines the air-fuel ratio. This fuel injection duration T is computed from an equation $T=t\times K_1\times K_2\times K_3$. The next step 1016 sets the fuel injection amount T data in the counter 109. A step 1017 returns the control to the main routine. When the control is returned to the main routine, the process step interrupted by the interrupt handling is resumed.

It will thus be seen from the foregoing description that a basic fuel injection amount is computed from the quantity of air Q drawn into the engine 1 and its rpm N and the computed amount is corrected by a compensation value $K_1$ corresponding to the intake air temperature and the cooling water temperature, thus determining the amount of fuel to be injected by the open loop control. The thus determined fuel injection amount is corrected by a compensation value $K_2$ corresponding to the output of the $O_2$ sensor 14 and thus the air-fuel ratio of an air-fuel mixture is controlled at around the stoichiometric ratio by the closed loop control. However, if the $O_2$ sensor 14 is inactive, the compensation value $K_2$ is set to $K_2=1$ so that the closed loop control responsive to the output of the $O_2$ sensor 14 cannot be accomplished and the air-fuel ratio of mixtures cannot be controlled at the stoichiometric ratio. On the other hand, if the conditions (the intake air amount Q and the engine rpm N) of the engine 1 change abruptly during the periods of transitional operation, the basic fuel injection amount will change abruptly and compensation of the fuel injection amount by the compensation value $K_2$ corresponding to the output of the $O_2$ sensor 14 will fail to follow up or respond to the change. The compensation of fuel injection amount by the compensation value $K_3$ of this invention will be particularly effective during the periods of such operation. As mentioned previously, the compensation value $K_3$ is varied (corresponding to integration) at intervals of a predetermined time $\Delta t_2$ in response to the compensation value $K_2$ computed by varying (corresponding to integration) the output of the $O_2$ sensor 14 and a large number of compensation values $K_3$ each corresponding to an engine operating condition determined by the particular intake air amount Q and the engine rpm N are stored in the memory. Thus, any particular compensation value $K_3$ such as $K_3(n,m)$ indicates the degree of deviation from the stoichiometric ratio of the air-fuel ratio of a mixture at the corresponding engine operating condition such as $Q_m$, $N_n$ or the degree of compensation of the fuel injection amount. As a result, at the current engine operating condition (e.g., $Q_m$, $N_n$), if the fuel injection amount compensation value $K_3$ such as $K_3(n,m)$ corresponding to the same previous operating condition is read out from the RAM 107 and the currently computed fuel injection amount is compensated by this value $K_3(n,m)$, it is possible to predictively control the air-fuel ratio at the stoichiometric ratio. The RAM 107 storing the compensation values $K_3$ is always supplied with the power from the power source 17 so that all the compensation values $K_3$ can be maintained even after the engine is stopped and consequently the compensation values $K_3$ can be used for the air-fuel ratio controlling purposes when the engine is started again. Consequently, it is not necessary to update all of the compensation values stored in the RAM 107 all over again each time the engine is started or the vehicle is run and the compensation values $K_3$ can be readily used as soon as the engine operation is started.

On the other hand, as is generally known in the art, when the RAM 107 is disconnected from the power source 17, even if the RAM 107 is connected again to the power source 17, the stored contents of the RAM 107 will tend to be lost. As a result, if the engine is started again in such a condition, the air-fuel ratio of mixtures will be undesirably controlled with erroneous compensation values $K_3$. Further, the engine must be operated for a long period of time so as to restore all of the lost compensation values $K_3$.

Figure 7:
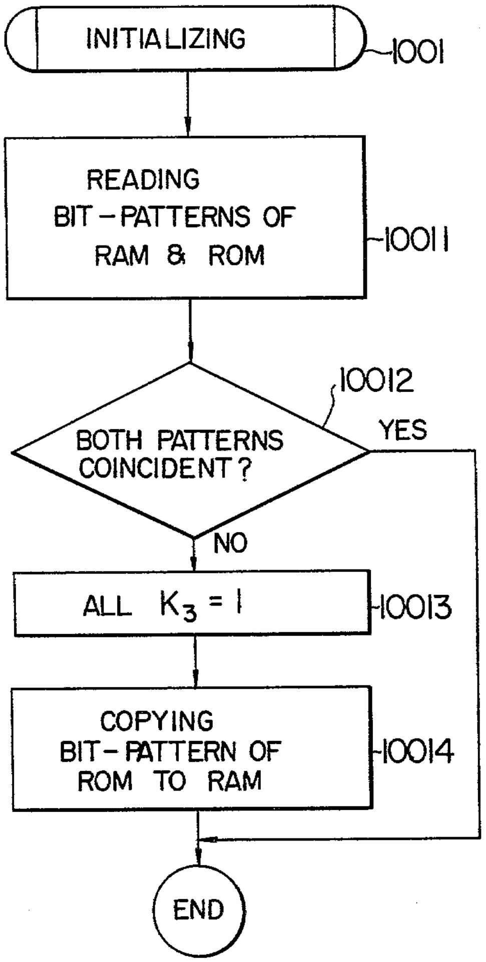
FIG. 7 is a detailed flow chart of the step 1001 shown in FIG. 3.

To prevent the air-fuel ratio of mixtures from being controlled erroneously, in accordance with the invention the step 1001 shown in FIG. 3 performs the steps shown in FIG. 7. For purposes of the description, assume that a reference value such as a predetermined binary-coded pattern is stored in each of the particular storage location of the RAM 107 and the same pattern is stored in the ROM 108 as a first predetermined value (e.g., the locations $x_1$, $x_2$, $x_3$, and $x_4$ of the RAM 107 and the locations $y_1$, $y_2$, $y_3$ and $y_4$ of the ROM 108) in such a manner that "01010101" is stored in the locations $x_1$ and $y_1$, respectively, "10101010" in $x_2$ and $y_2$, respectively, "1010010" in $x_3$ and $y_3$, respectively and "01011010" in $x_4$ and $y_4$, respectively. While the binary-coded patterns or bit patterns in the RAM 107 will be lost or become erroneous ones if the RAM 107 is disconnected from the power source, the bit patterns in the ROM 108 will not be lost or become erroneous ones even if the power supply to the ROM 108 is cut off. In performing the step 1001 of FIG. 3, firstly a step 10011 of FIG. 7 reads out the bit patterns stored in the locations $x_1$, $x_2$, $x_3$ and $x_4$ of the RAM 107 and those stored in the locations $y_1$, $y_2$, $y_3$ and $y_4$ of the ROM 108, and the next step 10012 compares them with one another. When a complete coincidence is found between them or YES, the initialization step is completed. When this occurs, the compensation values $K_3$ stored in the RAM 107 are considered to be correct and these compensation values $K_3$ are used in the subsequent control of air-fuel ratio. If there is even a slight difference between the patterns or NO, a step 10013 changes all the compensation values $K_3$ currently stored in the RAM 107 to a second predetermined value $K_3=1$. The next step 10014 writes the bit patterns stored in the locations $y_1$, $y_2$, $y_3$ and $y_4$ of the ROM 108 as such into the corresponding locations $x_1$, $x_2$, $x_3$ and $x_4$ of the RAM 107 and the initialization step is completed. In this case, while the compensation of air-fuel ratio by the compensation value $K_3$ will not in effect be performed due to the updating of all the compensation values $K_3$ to $K_3=1$, this has the effect of preventing the control of air-fuel ratio by an erroneous compensation value $K_3$. Also, by virtue of the fact that the bit patterns stored in the ROM 108 are newly stored in the RAM 107, when the initialization step 1001 is again performed, the newly stored bit patterns can be used to determine whether the stored contents of the RAM 107 are correct. It is to be noted that there is no need to store a plurality of bit patterns in the RAM 107 and the ROM 108, respectively, and it will suffice to store a single bit pattern in place of the plurality of patterns.

With the above-described embodiment, if the engine is operated continuously under the same condition, there is the possibility of correcting only the same one of the compensation amounts $K_3$ or $K_3(n,m)$ and making excessively large the difference in value between it and the adjacent $K_3(n+1, m+1)$ and $K_3(n-1, m-1)$ and consequently it is possible to arrange so that the adjacent amounts to $K_3(n,m)$ will be modified by learning. In this case, in this embodiment the step 1005 of the main routine for computing the compensation amount $K_3$ is programmed so that when the integrated value or the compensation amount $K_2$ is $K_2>1$, the step 504 of FIG. 5 computes to obtain $K_3(n,m)=K_3(n,m)+3\Delta K_n$, $K_3(n\pm1, m\pm1)=K_3(n\pm1, m\pm1)+2\Delta K_n$, $K_3(n\pm1, m\pm2)+\Delta K_n$, $K_3(n\pm2, m\pm1)=K_3(n\pm2, m\pm1)+\Delta K_n$, $K_3(n\pm2, m\pm2)=K_3(n\pm2, m\pm2)+\Delta K_n$, etc. In other words, if the correction value for the center value $K_3(n,m)$ is 3, the next values will be modified by 2 in the same sense and the next but one values will be similarly modified by 1. When $K_2<1$, the step 503 performs the operation of subtraction in a like manner and stores the results in the RAM 107.

While, in the above-described embodiment, the compensation amount $K_3$, such as $K_3(n,m)$ is obtained in such a manner that depending on the positive or negative sign of the compensation amount $K_2$, a predetermined correction value $\Delta K_3$ ($3\Delta K_n$, $2\Delta K_n$ or $\Delta K_n$) is added to or subtracted from the value previously stored in the RAM 107, it is possible to obtain the desired value $K_3$ by multiplying the compensation amount $K_2$ by a constant $\alpha$ or a value $\alpha_n$ which varies in accordance with the engine conditions.

Figure 8:
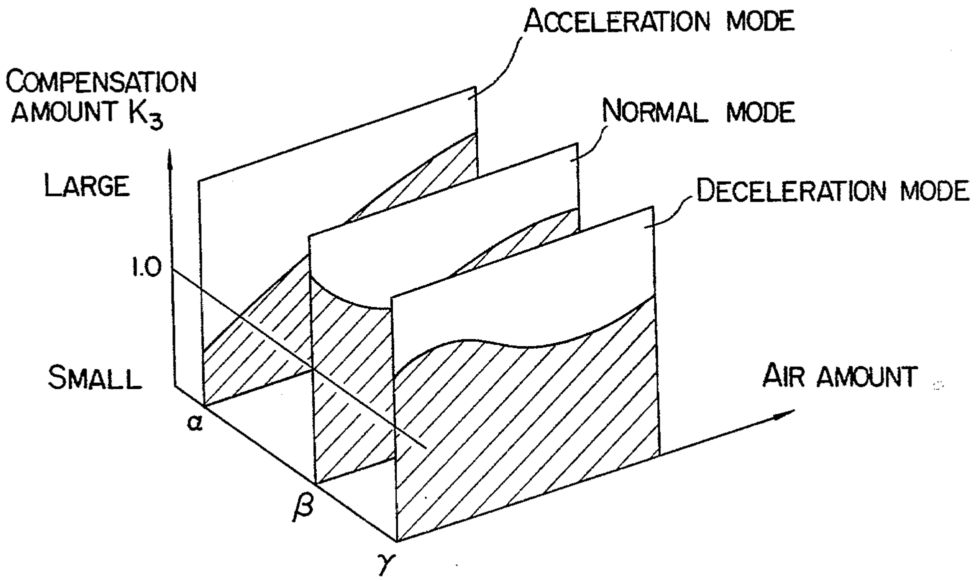
FIG. 8 is a graph showing a three-dimensional map of compensation amounts $K_3$ which is useful in explaining the operation of a second embodiment of the invention.

Further, while, in the embodiment, the map is prepared by using the quantity of sucked air Q and the engine rpm N as parameters for dividing and storing the compensation amounts $K_3$ in the RAM 107 and arranging the parameter values in predetermined steps as shown in FIG. 6, this increases the number of values $K_3$ and hence the number of memories with the resulting possibility of increasing the cost and deteriorating the reliability. As a result, in the second embodiment shown in FIG. 8, the compensation values $K_3$ may be comprised of three values or so, such as $K_3(\alpha,m)$, $K_3(\beta,m)$ and $K_3(\gamma,m)$ respectively corresponding to the acceleration, deceleration and normal operations of the engine and only the intake air amount Q may be used as a parameter. The acceleration and deceleration conditions may be determined in accordance with the varied value (or integrated value) of the intake air amount or the engine speed. These conditions may also be determined in accordance with the value of the basic fuel injection quantity $t=F(Q/N)$ or alternatively a predetermined period of time, e.g., 5 seconds after the closing or opening of a switch (e.g., an idle switch) for detecting the fully closed position of the throttle valve may be used as a determining value. FIG. 8 shows a three-dimensional map of the compensation amounts $K_3$ according to three modes of acceleration, deceleration and normal operations.

Further, while, in the above-described embodiments, the intake air amount is used as a parameter for dividing and storing the compensation amount $K_3$ in the RAM 107, it is of course possible to use for example the intake vacuum or the throttle valve position as the parameter.

Still further, while, in these embodiments, the step 1005 for computing and storing the compensation amounts $K_3$ is designed so that the value of $K_3$ is computed and written (stored) at intervals of a unit time $\Delta t_2$, it is of course possible to arrange so that the compensation amount $K_3$ is computed and written into the memory for every number of engine revolutions, $\Delta N$. In the latter case, a suitable number of revolutions from the standpoints of control response and control accuracy will be on the order of 30 revolutions for the normal engine operation and about 20 revolutions for the transitional engine operation such as the acceleration or deceleration operation.

Still further, while these embodiments have been described as designed so that the air-fuel ratio is controlled by modifying the compensation amounts for the amount of fuel to be injected by electronically controlled fuel injection, it is of course possible to apply the invention to the control of air-fuel ratio which will be accomplished by modifying the compensation amounts for the amount of fuel supplied to the carburetor, the amount of air bypassing the carburetor or the amount of secondary air supplied to the engine exhaust system.

We claim:

1. An apparatus for controlling the air-fuel ratio in a mixture to be supplied to a combustion engine comprising:

intake sensor means for sensing an intake condition of said combustion engine;

means for generating a signal related to a rotational speed of said combustion engine;

means for detecting the relation between an air-fuel ratio in a mixture supplied to said combustion engine and a predetermined ratio;

read/write memory means kept operative irrespective of the operation of said combustion engine and capable of storing a reference value in a first addressable location and a group of correction values in second addressable locations;

means for storing a first predetermined value and a second predetermined value, said storing means maintaining said first value even when said power to said storing means is off;

processor means, kept operative during the operation of said combustion engine, for:

(1) comparing a reference value read out from said first location with said first value, (2) writing said first value in said first location and said second value in each of said second locations when said reference value differs from said first value, said second value being ineffective to correct the amount of fuel to be supplied to said combustion engine, (3) repeatedly determining a correction value in accordance with an output of said detecting means;

(4) repeatedly writing said determined correction value in one of said second locations related to at least said sensed intake condition, and (5) repeatedly determining the amount of fuel to be supplied to said combustion engine in accordance with said sensed intake condition and rotational speed and correcting the determined amount of fuel using one of said correction values read out from one of said second locations related to at least said sensed intake condition; and fuel supply means for supplying said combustion engine with the corrected amount of fuel.

2. An apparatus according to claim 1, further comprising means for maintaining the contents of the second locations of said read/write memory means even when electrical energy to said engine is shut off.

3. An apparatus according to claim 2, wherein the first locations of said read/write memory means include a location for storing a bit-pattern as said reference value, said processor means comparing a bit-pattern stored in said first location with a predetermined bit-pattern as said first predetermined value at the start of the operation thereof, to initialize the values stored in the second locations to said second predetermined value when said reference value and said first predetermined value bit-patterns are different from each other.

4. An apparatus for controlling the supply of fuel to a combustion engine comprising:

intake sensor means for sensing an intake condition of said combustion engine;

means for generating a signal related to a rotational speed of said combustion engine;

means for generating a ratio signal corresponding to the relation between an air-fuel ratio in a mixture supplied to said combustion engine and a predetermined ratio;

read only memory means for storing a control program;

read/write memory means having a plurality of memory locations assigned in relation to at least intake conditions of said engine;

processor means for receiving said sensed intake condition, rotational speed and ratio signal and for:

generating a first value indicative of a basic amount of fuel to be supplied to said engine, said first value being determined from at least said sensed intake condition and said rotational speed, generating a second value for correcting said first value when a closed loop fuel control is effected in response to said ratio signal, said second value being increased or decreased at predetermined intervals in relation to the magnitude of said ratio signal relative to a reference value indicative of a stoichiometric air-fuel ratio, addressing one of said plurality of memory locations of said read/write memory means related to at least said sensed intake condition to read one of a plurality of third values stored therein, generating a new third value at every predetermined interval by increasing or decreasing said one of third valves in relation to the magnitude of said second value relative to a reference value indicative of no correction of said first value and writing said new third value as said one of said third values in said one of said plurality of memory locations, and generating a fourth value indicative of the required amount of fuel to be supplied to said engine, said fourth value being determined by correcting said first value by said second and third values when said closed loop fuel control is effected and by correcting said first value by said third value when an open loop fuel control is effected; and fuel supply means for supplying fuel to said combustion engine by the amount of fuel determined by said fourth value.

5. An apparatus for controlling supply of fuel to a combustion engine according to claim 4 in which said processor means also modifies third values stored in said read/write memory means and adjacent to said one of said plurality of third values by an amount less than the amount of increase or decrease of said one of said plurality of third values.

6. A method of controlling the air-fuel ratio in a mixture to be supplied to a combustion engine comprising the steps of:

generating an intake signal related to an intake condition of said combustion engine;

generating a speed signal related to the rotational speed of said combustion engine;

generating a ratio signal related to the relation between an air-fuel ratio in a mixture supplied to said combustion engine and a predetermined ratio;

storing a reference value in a first addressable location and a group of correction values in second addressable locations of a read/write memory;

comparing a reference value stored in said first addressable location with a predetermined first value;

storing said first value in said first location and a second predetermined value in each of said second locations when said reference value differs from said first value, said second value being ineffective to correct the amount of fuel to be supplied to said combustion engine;

determining a correction value in accordance with said ratio signal;

storing said determined correction value in one of said second locations related to said intake signal;

determining the amount of fuel to be supplied to said combustion engine in accordance with said intake signal and speed signal and correcting said determined amount of fuel using one of said correction values from one of said second locations related to at least said intake signal; and supplying said combustion engine with the corrected amount of fuel.

7. A method for controlling the supply of fuel to a combustion engine comprising the steps of:

generating an intake signal related to an intake condition of said combustion engine;

generating a speed signal related to the rotational speed of said combustion engine;

generating a ratio signal related to the relation between an air-fuel ratio in a mixture supplied to said combustion engine and a predetermined ratio;

determining a first value indicative of a basic amount of fuel to be supplied to said engine, said first value being determined from at least said intake signal and said speed signal;

determining a second value for correcting said first value when a closed loop fuel control is effected in response to said ratio signal, said second value being increased or decreased at predetermined intervals in relation to the magnitude of said ratio signal relative to a predetermined reference value indicative of a stoichiometric air-fuel ratio;

addressing one of a plurality of memory locations of a read/write memory means related to at least said intake signal to read one of a plurality of third values stored therein;

incrementally changing said one of a plurality of third values at predetermined intervals in relation to the magnitude of said second value relative to a predetermined reference value indicative of no correction of said first value;

storing said incrementally changed third value as one of said third values in said one of said plurality of memory locations;

determining a fourth value indicative of the required amount of fuel to be supplied to said engine, said forth value being determined by correcting said first value by said second and third values when said closed loop fuel control is effected and by correcting said first value by said third value when an open loop fuel control is effected; and supplying fuel to said combustion engine by the amount of fuel determined by said fourth value.

* * * * *